United States Patent [19] [11] Patent Number: 5,138,987
Schmid et al. [45] Date of Patent: Aug. 18, 1992

[54] PROCESS FOR HEATING THE INTAKE AIR INTERNAL COMBUSTION ENGINES BY MEANS OF A FLAME STARTING SYSTEM

[75] Inventors: Friedrich Schmid, Korb; Friedrich Hase, Stuttgart; Peter Joppig, Korb; Roland Klak, Ostfildern, all of Fed. Rep. of Germany

[73] Assignee: Mercedes-Benz AG, Fed. Rep. of Germany

[21] Appl. No.: 811,674

[22] Filed: Dec. 23, 1991

[30] Foreign Application Priority Data

Dec. 22, 1990 [DE] Fed. Rep. of Germany ....... 4041631

[51] Int. Cl.$^5$ .................... F02P 19/02; F02N 17/047
[52] U.S. Cl. ............................ 123/179.21; 123/550; 123/556
[58] Field of Search .................. 123/179.21, 550, 551, 123/556, 549

[56] References Cited

U.S. PATENT DOCUMENTS

| | | | |
|---|---|---|---|
| 4,027,642 | 6/1977 | Kamada et al. | 123/550 |
| 4,587,941 | 5/1986 | Mishina et al. | 123/179.21 |
| 4,648,361 | 3/1987 | Hales | 123/179.21 |
| 4,849,604 | 7/1989 | Woolcott | 123/179.21 |
| 4,854,290 | 8/1989 | Richardt | 123/179.21 |
| 4,944,260 | 7/1990 | Shea et al. | 123/556 |
| 4,962,300 | 10/1990 | Watanabe | 123/179.21 |
| 5,050,545 | 9/1991 | Shirata et al. | 123/179.21 |

FOREIGN PATENT DOCUMENTS 2549663 8/1982 Fed. Rep. of Germany.
3342865 11/1989 Fed. Rep. of Germany.

Primary Examiner—Andrew M. Dolinar
Assistant Examiner—M. Macy
Attorney, Agent, or Firm—Evenson, Wands, Edwards, Lenahan & McKeown

[57] ABSTRACT

A process and device for heating the intake air in internal-combustion engines by means of a flame starting system is disclosed which contains at least one heater plug and has a control unit which supplies the heater plug with voltage for a specific preheating time. To provide a process, by means of which the preheating temperature of the heater plug necessary for starting is safely reached independently of changing boundary conditions, it is proposed to carry out the following cyclically repeating steps: detection of the voltage available at the output of the control unit, determination of a preheating time, associated with this voltage value, for the heater plug, determination of a step value from the division of a predetermined standard value for the preheating time by the value determined for the preheating time, summing of the individual step values in a memory erased at the commencement of the process, and comparison of the memory content with predetermined standard value and termination of the preheating when the standard value is reached, or return to process step (a) as long as the standard value is not reached.

14 Claims, 1 Drawing Sheet

PROCESS FOR HEATING THE INTAKE AIR INTERNAL COMBUSTION ENGINES BY MEANS OF A FLAME STARTING SYSTEM

BACKGROUND AND SUMMARY OF THE INVENTION

The invention relates to a process for heating the intake air in internal-combustion engines by means of a flame starting system.

A process of this type is known from German Patent Specification 3,342,865. This is concerned with a flame starting system, in which the air flowing through the intake pipe is preheated in the warming-up phase of the internal-combustion engine to prevent so-called "white smoke". For this purpose, in the suction pipe of the internal-combustion engine there is provided a combustion chamber in which a fuel-injection nozzle and a heater plug are arranged. For starting the internal-combustion engine at relatively low temperatures, the heater plug is preheated, and after the expiry of the preheating time, during the starting of the engine, fuel is delivered via a solenoid valve to the fuel-injection nozzle and consequently into the combustion chamber of the flame starting system. The fuel ignited in the combustion chamber preheats the intake air flowing past and allows a reliable ignition of the cylinders of the internal-combustion engine at low outside temperatures. A continuous current is fed to the heater plug for the duration of a specific first period of time until the engine is turning over reliably, and, after the expiry of this first period of time, a pulsed current corresponding to reduced power is fed to it for a second period of time until the engine has reached a specific operating temperature.

A disadvantage here is that a fixed preheating time, during which the heater plug is supplied with voltage, is assumed for the preheating, and consequently the preheating temperature of the heater plug necessary for starting is not always safely reached.

An object of the invention is to provide a process, starting from the state of the art, by means of which the preheating temperature of the heater plug necessary for starting is safely reached independently of changing boundary conditions.

This object is achieved according to the invention by an arrangement wherein the following cyclically repeating steps are carried out:

(a) detection of the voltage available at the output of the control unit, (b) determination of a preheating time ($T_v$), associated with this voltage value, for the heater plug, (c) determination on of a step value ($\Delta S$) from the division of a predetermined standard value (S) for the preheating time by the value determined for the preheating time ($T_v$), (d) summing of the individual step values ($\Delta S$) in a memory erased at the commencement of the process, and (e) comparison of the memory content with the predetermined standard value (S) and termination of the preheating when the standard value (S) is reached, or return to process step (a) as long as the standard value (S) is not reached.

During the operation of preheating the heater plug, the voltage available at the output of the control unit is detected continuously and an associated preheating time is determined from the voltage values. A predetermined standardized value for the preheating time is divided by the necessary preheating time determined and is filed in a previously erased memory. This operation is repeated according to a fixed chronological cycle, the result is added to the value filed in the memory and the sum is compared with the predetermined standard value. This operation is repeated until the standard value is reached. When the standard value is reached, the preheating time of the flame starting system is terminated.

Other objects, advantages and novel features of the present invention will become apparent from the following detailed description of the invention when considered in conjunction with the accompanying drawings.

DETAILED DESCRIPTION OF THE DRAWINGS

According to the invention, during the entire preheating operation the voltage available at the output of the control unit for supplying the heater plug is detected. As a function of this voltage, a value associated with this voltage is determined for the preheating time of the heater plug from the preheating times stored, for example, in a family of characteristics of the control unit which can be designed as a programmable microprocessor. In accordance with this family of characteristics, longer preheating times are assigned to low voltage values and shorter preheating times to high voltage values, so that even with a low supply voltage the preheating temperature necessary for starting the system is reached, and on the other hand at a high supply voltage the flame starting system is not preheated for too long.

Figure 1:
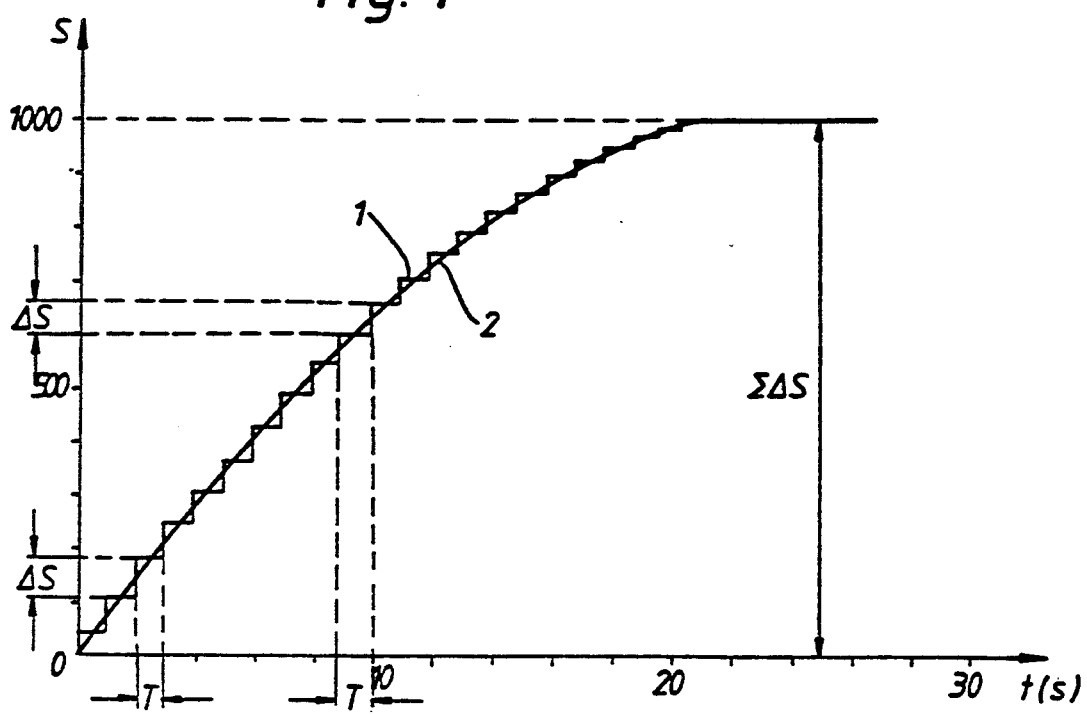
FIG. 1 is a graph which shows a preheating operation process according to the invention.

The preheating time for the heater plug is standardized to a specific value S dependent on the necessary accuracy, as represented in FIG. 1 by the value 1000 of the ordinate. The time t in seconds is plotted on the abscissa of this FIGURE. In a predetermined chronological cycle T, which in this example is assumed to be one second, there is determined, by dividing the standardized value S, that is to say equal to 1000 here, by the preheating time value $T_v$ determined from the family of characteristics, a step value $\Delta S = S/T\Delta_v$, which is filed in a memory erased at the start of the process. With each further cycle T, the voltage is detected once again, the associated value for the preheating time $T_v$ is determined, the step value $\Delta S$ is formed from this, and the latter is added to the step values filed in the memory for the preceding cycles. Since the standardized value S is fixed, the step values $\Delta S$ consequently change with the determined preheating time $T_v$, that is to say with a changing voltage at the output of the control unit.

These process steps are repeated cyclically until the sum value $\Sigma \Delta S$ from the individual step values $\Delta S$ which is added up in the memory reaches to the standardized value S and the preheating operation is terminated. This ensures that, even when the voltage changes during the preheating, the standardized value S and therefore also the necessary preheating temperature or ignition temperature of the heater plug are always achieved. The trend of this function is shown in FIG. 1, in which the respective associated step value ΔS of the step function designated by 1 are marked for two chronological cycles T singled out by way of example. The curve trend 2 represented within the step function 1 indicates the trend of the heater-plug temperature in this FIGURE.

In a further embodiment of the process according to the invention, the step values S can be predetermined not only as a function of the voltage-dependent preheating time determined, but additionally as a function of the selected chronological cycle and also as a function of the respective operation phase of the flame starting system, such as, for example, preheating, cooling or repeated starting.

Figure 2:
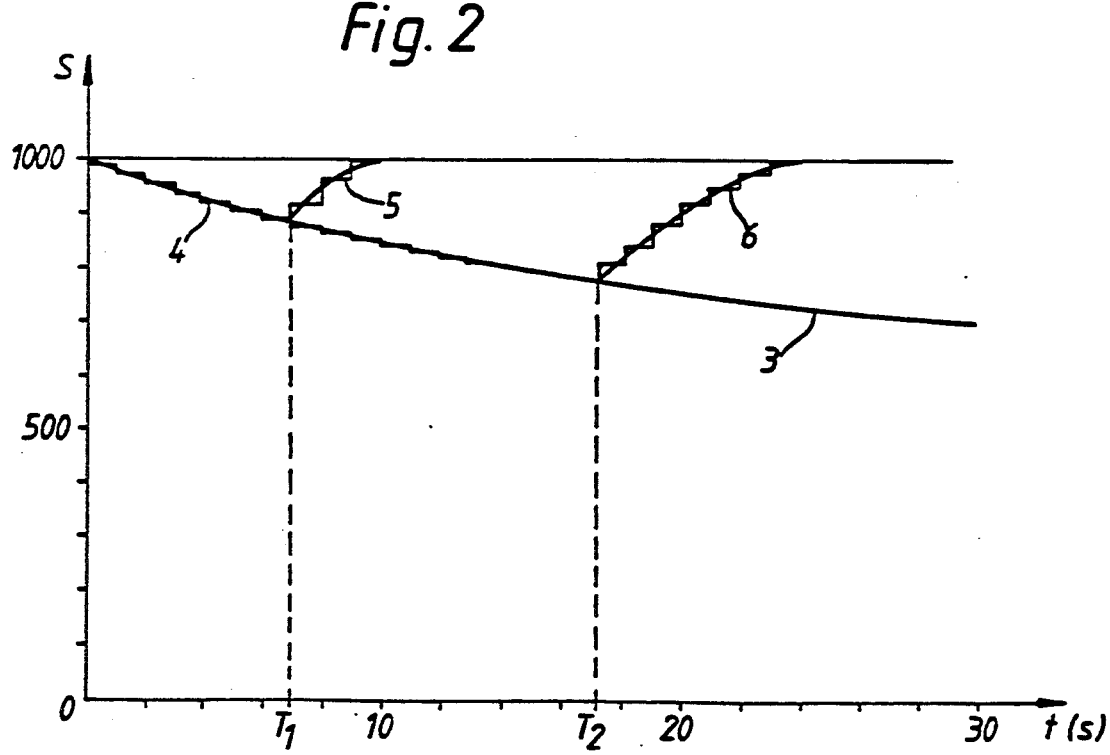
FIG. 2 is a graph which shows the operation of cooling the heater plug with subsequent repeated starting in accordance with the invention.

If the heater plug has reached its preheating temperature, but starting has nevertheless not taken place or the starting operation is cut off again, the heater plug cools according to the cooling curve 3 shown in FIG. 2. In a similar way to the preheating process described previously, here too the step values are obtained by evaluating the voltage present at the output of the control unit and by determining a step value, these step values being subtracted cycle by cycle from the instantaneous value stored in the memory, so that the memory content always becomes smaller. This occurs in the step function designated by 4.

By way of example, a time point $T_1$ or $T_2$ is marked in this FIGURE for the commencement of a repeated starting. Such a repeated starting with its trend comparable to the preheating shown from the description relating to FIG. 1 is designated by 5 or 6 in FIG. 2. The execution corresponds here to the known preheating, with the difference that the individual step values are added to the instantaneous memory content determined by subtraction during the cooling of the heater plug, until the standardized value S is reached again.

The advantage of the process according to the invention is that, by constantly taking into account the instantaneous voltage available at the output of the control unit for supplying the heater plug, the preheating temperature is safely reached, despite changing voltage conditions during the preheating. Thus, for example, the voltage of the vehicle battery decreases with falling outside temperatures, that is to say precisely when a flame starting system is appropriately used. Moreover, the battery voltage depends on the capacity of the battery. The use of a different number and type of heater plugs also results in a fluctuation of the voltage during the preheating operation. All these influences are compensated by the evaluation of the current available voltage by means of the process according to the invention, and the necessary preheating time is coordinated with these requirements.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Process for heating the intake air in internal combustion engines by means of a flame starting system containing at least one heater plug and having a control unit which supplies the heater plug with voltage for a specific preheating time, said process comprising the following cyclically repeating steps:

(a) detection of the voltage available at the output of the control unit, (b) determination of a preheating time, associated with this voltage value, for the heater plug, (c) determination of a step value from the division of a predetermined standard value for the preheating time by the value determined for the preheating time, (d) summing of the individual step values in a memory erased at the commencement of the process, and (e) comparison of the memory content with the predetermined standard value and termination of the preheating when the standard value is reached, or return to process step (a) as long as the standard value is not reached.

2. Process according to claim 1, wherein the preheating time is selected as function of the voltage at the output of the control unit.

3. Process according to claim 1, wherein the memory content is reduced cyclically by the respective step values after the preheating has terminated.

4. Process according to claim 2, wherein the memory content is reduced cyclically by the respective step values after the preheating has terminated.

5. Process according to claim 1, wherein, in the event of a repeated starting after the preheating has terminated, the memory content is increased cyclically, starting from instantaneous memory content, by the respective step values, a comparison of the memory content with the predetermined standard value being carried out in each case, and the heating operation being terminated when the standard value is reached.

6. Process according to claim 3, wherein, in the event of a repeated starting after the preheating has terminated, the memory content is increased cyclically, starting from instantaneous memory content, by the respective step values, a comparison of the memory content with the predetermined standard value being carried out in each case, and the heating operation being terminated when the standard value is reached.

7. Process according to claim 4, wherein, in the event of a repeated starting after the preheating has terminated, the memory content is increased cyclically, starting from instantaneous memory content, by the respective step values, a comparison of the memory content with the predetermined standard value being carried out in each case, and the heating operation being terminated when the standard value is reached.

8. Process according to claim 1, wherein the step values are dependent on the applied chronological cycle.

9. Process according to claim 5, wherein the step values are dependent on the applied chronological cycle.

10. Process according to claim 1, wherein the step values are dependent on the respective operating phase of the flame starting system.

11. Process according to claim 5, wherein the step value are dependent on the respective operating phase of the flame starting system.

12. Process according to claim 8, wherein the step value are dependent on the respective operating phase of the flame starting system.

13. Device for carrying out a process of heating the intake air in internal combustion engines by means of a flame starting system containing at least one heater plug and having a control unit which supplies the heater plug with voltage for a specific preheating time, said device including
- (a) means for detection of the voltage available at the output of the control unit,
- (b) means for determination of a preheating time, associated with this voltage value, for the heater plug,
- (c) means for determination of a step value from the division of a predetermined standard value for the preheating time by the value determined for the preheating time,
- (d) means for summing of the individual step values in a memory erased at the commencement of the process, and
- (e) means for comparison of the memory content with the predetermined standard value and termination of the preheating when the standard value is reached, or return to process step (a) as long as the standard value is not reached, said device comprising a control unit of the flame starting system which is an electronic control unit with a family of characteristics for storing the values for the preheating time.

14. Device according to claim 13, wherein, the electronic control unit is a programmable microprocessor.

* * * * *